United States Patent
Miyazawa

(10) Patent No.: US 6,747,411 B2
(45) Date of Patent: Jun. 8, 2004

(54) CERAMIC ENVELOPE FOR HIGH INTENSITY DISCHARGE LAMP

(75) Inventor: Sugio Miyazawa, Kasugai (JP)

(73) Assignee: NGK Insulators, Ltd., Nagoya (JP)

(*) Notice: Subject to any disclaimer, the term of this patent is extended or adjusted under 35 U.S.C. 154(b) by 0 days.

(21) Appl. No.: 09/991,253

(22) Filed: Nov. 21, 2001

(65) Prior Publication Data

US 2002/0070667 A1 Jun. 13, 2002

(30) Foreign Application Priority Data

Nov. 22, 2000 (JP) .................... 2000-356503

(51) Int. Cl.[7] .............................. H01J 61/33
(52) U.S. Cl. .................... 313/634; 313/636
(58) Field of Search ................ 313/634, 635, 313/636, 624, 626, 493, 638, 639

(56) References Cited

U.S. PATENT DOCUMENTS

| | | | | |
|---|---|---|---|---|
| 2,116,429 A | * | 5/1938 | Gooskens | 220/2.1 R |
| 3,243,635 A | | 3/1966 | Louden et al. | |
| 3,832,590 A | | 8/1974 | Yamazaki et al. | |
| 3,875,277 A | | 4/1975 | Bratton et al. | |
| 4,222,978 A | * | 9/1980 | Oda et al. | 264/65 |
| 4,387,067 A | * | 6/1983 | Kobayashi et al. | 264/636 |
| 4,396,595 A | * | 8/1983 | Heytmeijer et al. | 264/65 |
| 4,503,356 A | * | 3/1985 | Kobayashi et al. | 313/634 |
| 4,625,149 A | | 11/1986 | Danno et al. | |
| 4,629,593 A | | 12/1986 | Groh et al. | |
| 4,799,601 A | | 1/1989 | Shimai et al. | |
| 5,424,609 A | * | 6/1995 | Geven et al. | 313/634 |
| 5,635,794 A | | 6/1997 | Koerfer | |
| 6,208,070 B1 | * | 3/2001 | Sugimoto et al. | 313/634 |
| 2002/0179859 A1 | * | 12/2002 | Takeji et al. | 250/503.1 |

FOREIGN PATENT DOCUMENTS

| | | | |
|---|---|---|---|
| EP | 0 220 633 A | 5/1987 | ............ H01J/61/30 |
| EP | 0 284 576 A2 | 9/1988 | |
| EP | 0 284 576 A | 9/1988 | ............ H01J/61/32 |
| EP | 0 667 322 A1 | 8/1995 | ............ C04B/35/00 |
| EP | 0 722 183 A2 | 7/1996 | |
| EP | 0 722 183 A | 7/1996 | ............ H01J/61/28 |
| EP | 0 954 010 A1 | 11/1999 | ............ H01J/61/36 |
| EP | 0 991 108 A2 | 4/2000 | ............ H01J/61/36 |
| GB | 1 360 340 A | 7/1974 | ............ B28B/21/00 |
| JP | 60-020446 | 2/1985 | |
| JP | 10-247476 | 9/1998 | |

OTHER PUBLICATIONS

U.S. patent application Ser. No. 10/057,005, Miyazawa, filed Oct. 29, 2001.
U.S. patent application Ser. No. 10/057,801, Miyazawa, filed Oct. 29, 2001.

(List continued on next page.)

*Primary Examiner*—Vip Patel
*Assistant Examiner*—Karabi Guharay
(74) *Attorney, Agent, or Firm*—Burr & Brown

(57) ABSTRACT

A ceramic envelope for a high intensity discharge lamp employs the ceramic envelope obtained by integrally forming each electrode insertion section and at least an end portion of a barrel section. An elliptical barrel section forms a discharge space and capillary sections are for insetting and fixing a discharge electrode. Further, the capillary sections protrude outwardly from both ends of the barrel section, while facing each other. The ceramic envelope mainly consists of alumina and is burned to exhibit light transmittable properties. Moreover, a boundary of the end portion corresponding to a corner of the discharge space, between the barrel section and each of the capillary sections is formed to have a radius of curvature of 1.0 mm. The ceramic envelope is capable of reducing light color changes of the discharge lamp and is capable of extending the service life of the lamp.

4 Claims, 3 Drawing Sheets

OTHER PUBLICATIONS

Patent Abstracts of Japan. vol. 008, No. 95 (E–242), May 2, 1984 & JP 59 014245 A (Nihon Gaishi KK), Jan. 25, 1984 *abstract*.

Patent Abstracts of Japan. vol. 1999, No. 10, Aug. 31, 1999 & JP 11 135064 A (NGK Insulators Ltd.), May 21, 1999 *abstract*.

Patent Abstracts of Japan. vol. 009, No. 136 (E–320), Jun. 12, 1985 & JP 60 020446 A(Mitsubishi Denki KK), Feb. 1, 1985 *abstract*.

Patent Abstracts of Japan. vol. 1998, No. 14, Dec. 31, 1998 & JP 10 247476 A (Toshiba Lighting & AMP; Technol Corp), Sep. 14, 1998 *abstract*.

* cited by examiner

Prior Art

CERAMIC ENVELOPE FOR HIGH INTENSITY DISCHARGE LAMP

BACKGROUND OF THE INVENTION

1. Field of the Invention

The present invention relates to a ceramic envelope consisting of a light transmittable ceramic employed for a high intensity discharge lamp, such as a high intensity sodium lamp or a metal halide lamp, and particularly relates to a ceramic envelope for high intensity discharge lamp formed by integrally forming electrode insertion section and at least end portions of a barrel section forming a discharge space.

2. Description of the Related Art

A discharge lamp employing a ceramic envelope made of light transmittable ceramics is advantageous in lamp efficiency, especially when the lamp has a discharge space formed into an elliptical shape by widening the diameter of a central section. Due to this, the discharge lamp is used in applications in which lamp efficiency is regarded as particularly important. A ceramic envelope of this type has the structure shown in FIG. 5, i.e., the ceramic envelope is formed such that an elliptical shape of barrel section 10 forming a discharge space is provided at the center thereof. In addition, capillary tubes 11 serving as electrode insertion sections are integrally formed with both end portions of the barrel section 10 in a longitudinal direction, while the capillary tubes 11 face each other. After light emission materials or starting gas is filled into the discharge space, electrodes are inserted into capillary tubes 11, and then capillary tubes 11 are sealed to form a discharge lamp.

The ceramic envelope of such a shape is manufactured by firing a member formed by casting, blowing, or vacuum molding techniques.

In case of the ceramic envelope having the integrally formed barrel section 10 and the capillary tubes 11, each of the internal boundary end portions 12 between the barrel section 10 and the capillary tubes 11 have a relatively large radius R because of its manufacturing technique. Due to this, when the electrode is inserted and the lamp is assembled, a large space is formed between the electrode and the ceramic envelope. While the lamp is lighted up, the temperature of this space is relatively low since the space is distant from the discharge section. As a result, the light emission materials in this space cannot be transformed into the materials in a gaseous phase but remain in the space in a liquid phase. This often causes an emission color change because the ratio of the light emission materials in the lamp changes thereby. In addition, these light emission materials, which are kept in the liquid phase, are exposed to high temperature while the lamp is lighted up. As a result, the ceramic envelope is gradually corroded and the extended service life of the lamp is impaired.

Moreover, since the linear transmittance of the ceramic envelope depends on surface roughness Rmax, it is more advantageous to set the surface roughness Rmax as small as possible. Nevertheless, while polishing can control the surface roughness of the inner surface of the ceramic envelope, the polishing step is complicated and not practical. Further, if the envelope is polished, an additive such as MgO or $La_2O_3$, which are considered to be less resistant against halide than alumina, appears on the inner surface of the envelope. Thus, good discharge characteristics cannot be maintained.

SUMMARY OF THE INVENTION

The present invention has been made in light of the above-stated problems. It is, therefore, an object of the present invention to provide a ceramic envelope for a high intensity discharge lamp formed by integrally forming electrode insertion sections and at least end portions of a barrel section. This envelope is capable of reducing light color changes of the high intensity lamp, and capable of extending the service life of the lamp.

According to a first aspect of the present invention, there is provided a ceramic envelope formed by integrally forming at least end portions of a barrel section forming a discharge space and small-diameter electrode insertion sections, which are provided to protrude outward from the end portions of the barrel section, respectively. The entire ceramic envelope is formed out of light transmittable ceramics. Further, a radius of curvature R is provided inside of a boundary end portion between the barrel section and at least one of said electrode insertion sections. A value of the R is set in a range of 0.01 to 3.0 mm.

By specifying the value of the R provided on the corrodible boundary end portion between the barrel section and each electrode insertion section to be small, the quantity of remaining light emission materials in a liquid phase can be decreased. Thus, the service life of the lamp is extended and the change of light color is reduced. In this case, it is more preferable that the value of R is in a range of 0.1 to 1.0 mm. A light emission tube having such value of R can be manufactured by lost wax techniques, powder press molding, extrusion press molding, frost molding, injection molding or gel casting molding techniques.

According to a second aspect of the present invention, there is provided a ceramic envelope for high discharge lamp according to the first aspect of the invention, wherein a surface roughness Rmax of an inner surface of the barrel section is set in a range of 0.01 μm to 0.4 μm, and the density of an additive on the inner surface of the barrel section is not more than half the density of the additive in a thick central portion of the barrel section.

By setting the Rmax value as the above, a barrel section with a good light transmittable property can be provided, and the reaction of the light emission materials such as halide with the additive can be suppressed. As a result, good discharge characteristics are maintained. More preferably, the surface roughness Rmax is in a range of 0.01 μm to 0.1 μm. It is noted that the density of the additive added to the ceramic on the surface of the envelope is reduced by the diffusion or splash action in the step of firing the formed member of the light emission tube. With this characteristic, the density of the additive on the surface can be set to be not more than half the density of the additive in the thick inside portion thereof. Due to this thin density of the additive, light emission materials such as halide can be suppressed from reacting with the additive and good discharge characteristics can be maintained.

According to a third aspect of the present invention, there is provided a ceramic envelope according to the second aspect of the invention, wherein the additive includes at least one material selected from the group consisting of $Sc_2O_3$, $MgO$, $ZrO_2$, $Y_2O_3$ and a lanthanoid-based rare earth oxide.

By adding this additive, grains of the parent phase of ceramic represented by alumina are suppressed from abnormally growing, and thus uniform grain growth is induced. Moreover, the surface roughness Rmax is controlled to have an appropriate value.

BRIEF DESCRIPTION OF THE DRAWINGS

FIG. 1A is an overall view and FIG. 1B is a partially enlarged view.

DETAILED DESCRIPTION OF THE INVENTION

The embodiments of the present invention will be described hereinafter in detail with reference to the drawings.

Figure 1A:
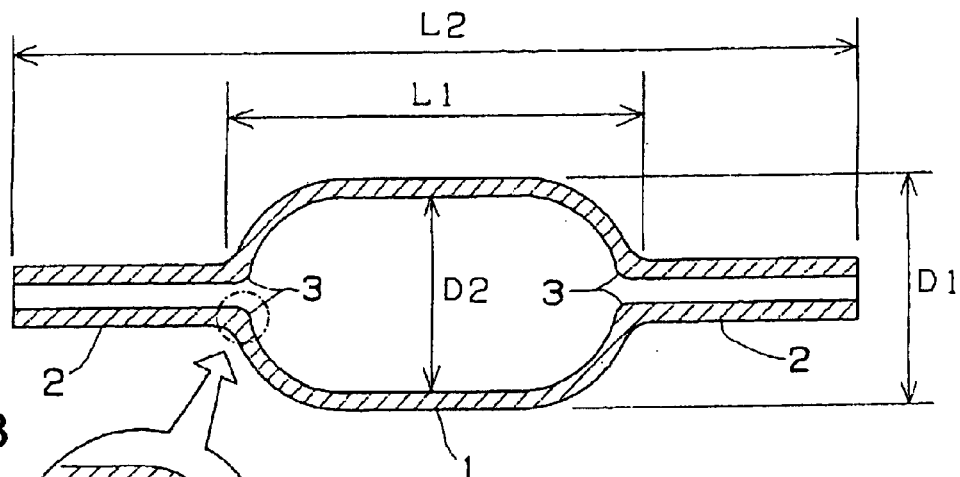
FIGS. 1A and 1B are cross-sectional explanatory views showing one example of an embodiment of a ceramic envelope for a high intensity discharge lamp according to the present invention, where
Figure 1B:
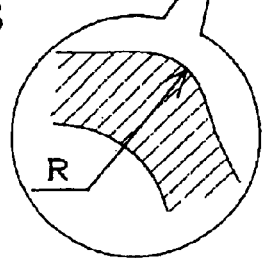

FIG. 1 is a cross-sectional explanatory view showing one example of a ceramic envelope for a high intensity discharge lamp according to the present invention. The ceramic envelope includes a barrel section 1 which has a discharge space formed into an elliptical shape with a diameter of central section widened. In addition, the ceramic envelope includes narrow-diameter capillary sections 2 serving as electrode insertion sections, which are formed by narrowing the right and left end portions of the barrel section 1. A rod-like current conductor (not shown) having a discharge electrode provided on a tip end is inserted and fixedly sealed into the capillary sections 2.

This ceramic envelope is formed from materials mainly containing alumina by adding MgO as an additive, for example. After being fired, the envelope has a light transmission property. The dimensions of the respective constituent elements will be shown by way of example. The outside diameter D1 of the barrel section 1 is 14.8 mm, the inside diameter D2 thereof is 13.0 mm, the length L1 thereof is 25.5 mm and the entire length L2 of light emission tubes is 55.7 mm. Also, the surface roughness Rmax of the inner surface of the envelope is set at 0.2 μm. Each of the inside boundary end portions 3 between the barrel section 1 and the capillary sections 2 is formed to have a radius of curvature R of 1.0 mm as shown in a partially enlarged view of FIG. 1B.

The ceramic envelope having such an R value can be formed by lost wax, powder press molding, extrusion press molding, frost molding, injection molding or gel casting techniques.

As stated above, by setting a relatively small R value in the corrodible boundary end portion between the barrel section and each electrode insertion section, the space in which light emission materials remaining in a liquid phase becomes smaller. As a result, the occurrence of corrosion is reduced and the service life of the lamp is extended. In addition, by decreasing the quantity of the light emission materials in the space, the unevenness of the change of light color can be reduced to 450 K (Kelvin) compared with the conventional unevenness of, for example, 600 K.

Further, grains of the parent phase of ceramic mainly consisting of alumina can be suppressed from abnormally growing, by adding the above-stated additive to alumina. Consequently, uniform grain growth is induced and linear transmittance is improved. It is noted that the surface roughness Rmax is preferably in a range between 0.01 μm and 0.4 μm in view of light transmittance and intensity. The additive may be $Sc_2O_3$, $ZrO_2$, $Y_2O_3$, a lanthanoid-based rare earth oxide, or a combination thereof.

Further, in the step of firing the formed member of the light emission tubes, the density of the additive added to alumina on the surface of the formed member is reduced by the diffusion or splash action thereof. With this characteristic, the density of the additive on the surface can be controlled to not more than half the density of the additive in the thick inside portion. By setting the density as described above, the light emission materials such as halide are suppressed from reacting with the additive, and good discharge characteristics are maintained.

If the R value is less than 0.01 mm, the crack occurrence frequency increases in thermal shock tests, and thus the end portions tend to be damaged. On the other hand, if the R value exceeds 3.0 mm, the light emission materials tend to remain, as seen in conventional light emission tubes, and thus the extended service life of the lamp cannot be obtained. For these reasons, it is preferable that the R value is in a range of 0.01 and 3.0 mm, more preferably, between 0.1 and 1.0 mm.

For reference, in thermal shock tests, a light emission envelope heated in air is put into the water. In this test, it is assumed that the temperature of the light emission envelope before being put into the water at which temperature cracks occur minus the water temperature equals $\Delta T$ (° C.), and that thermal shock resistance becomes greater as $\Delta T$ is higher. "n" represents the number of samples.

If $R \geq 0.01$ and n=10/10, $\Delta T$ (° C.)=190,

If R=0 and n=10/10, $\Delta T$ (° C.)=170,

If R=0.003 and n=10/10, $\Delta T$ (° C.)=180,

If R=0.005 and n=3/10, $\Delta T$ (° C.)=180,

If R=0.005 and n=7/10, $\Delta T$ (° C.)=190,

If R=0.05 and n=10/10, $\Delta T$ (° C.)=190,

If R=0.1 and n=3/10, $\Delta T$ (° C.)=190, and

If R=0.1 and n=7/10, $\Delta T$ (° C.)=200.

This variation relates to the thermal shock resistance by repeating light-up/light-out and correlates with the service life of the lamp.

Figure 2:
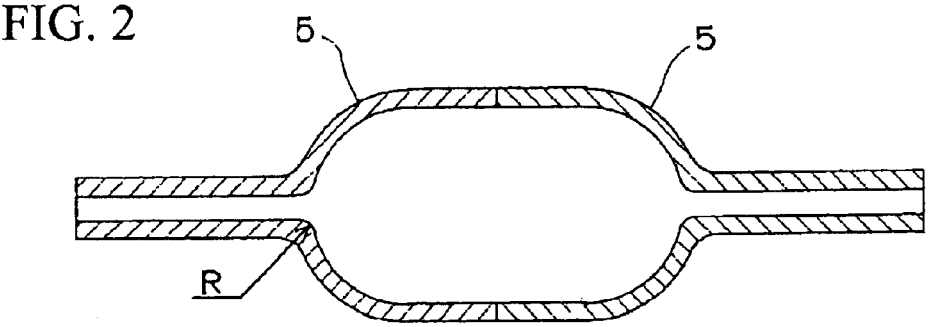
FIG. 2 is a cross-sectional explanatory view showing another embodiment of the present invention.

FIG. 2 is a cross-sectional explanatory view of a ceramic envelope showing another embodiment of the present invention. In this embodiment, the ceramic envelope is formed by coupling two formed members 5, 5 halved at the center and having the same shape as each other. Even if the ceramic envelope is formed as stated above, it is possible to ensure good additive density on the surface of the envelope and also possible to set the R value of each end portion to have an optimum value as in the case of the preceding embodiment. Besides, if the ceramic envelope consists of halves, the envelope can be easily formed by injection molding or casting.

Figure 3:
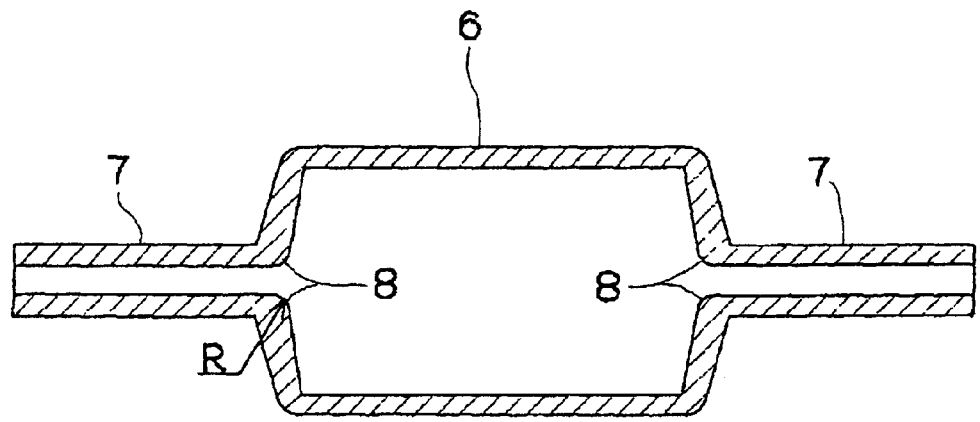
FIG. 3 is a cross-sectional explanatory view showing yet another embodiment of the present invention.

FIG. 3 is a cross-sectional explanatory view of a ceramic envelope showing yet another embodiment of the present invention. In this embodiment, the discharge space is formed as a cylindrical shape. As shown in FIG. 3, a barrel section 6 forming the light emission space is not necessarily elliptical. Even with such a shape, an extended service life of a lamp can be obtained by integrally forming capillary sections 7 and the end portions of the barrel section 6, and further by providing a predetermined R value on the inside boundary end portion 8 between each capillary section 7 and the barrel section 6.

Figure 4:
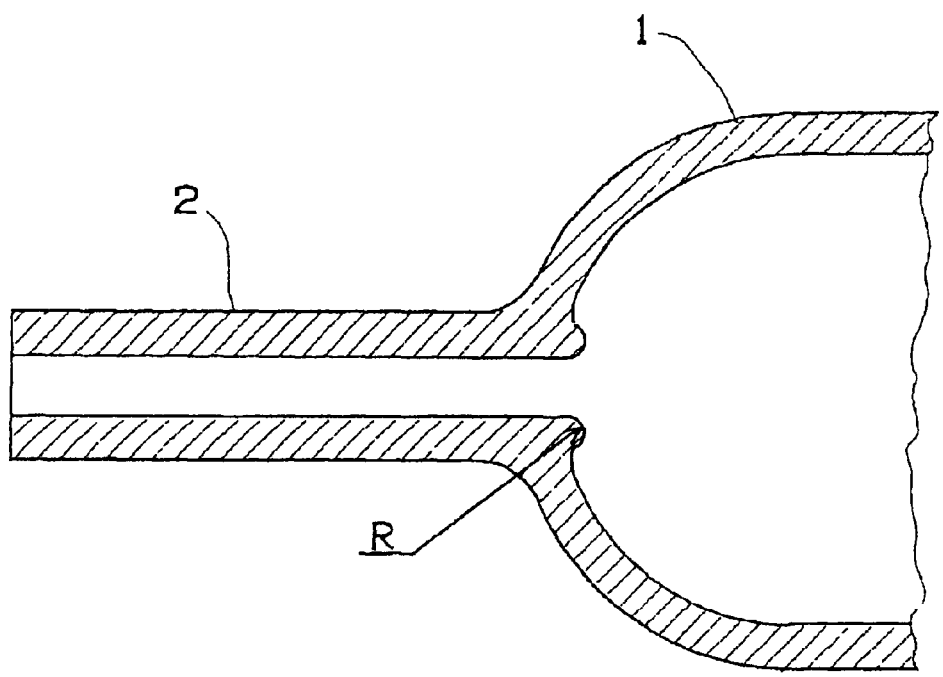
FIG. 4 is a partially cross-sectional explanatory view showing yet another embodiment of the present invention.
Figure 5:
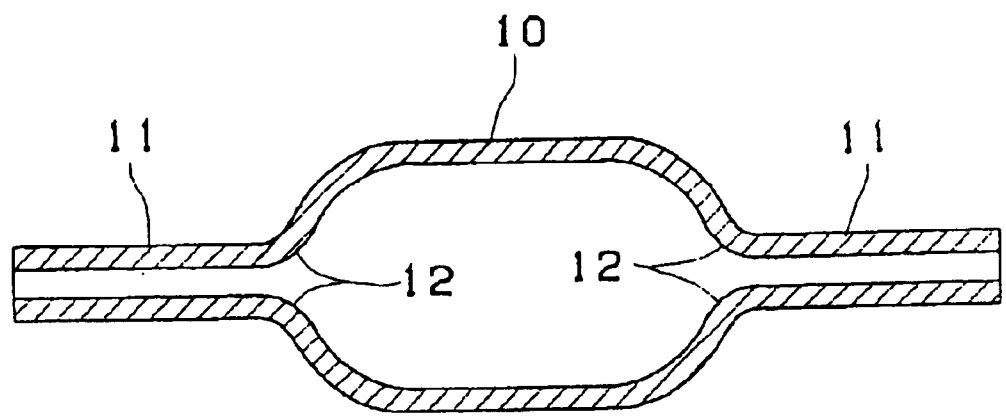
FIG. 5 is a cross-sectional explanatory view of a conventional ceramic lamp for a high intensity discharge lamp.

As shown in a partially cross-sectional explanatory view of FIG. 4, a shape of R that is provided inside of the boundary end portion between the barrel section and each electrode insertion section may be formed to protrude toward the center of the discharge space. Even with such a shape, the convection of light emission materials kept in a liquid phase can be reduced, and an extended service life of the lamp can be obtained as in the case of the preceding embodiments.

Furthermore, a region provided with the above-stated R may be one of the left and right corners of the discharge space. When a ceramic envelope is built vertically, light emission materials tend to remain in one of the corners which becomes a bottom. Due to this, only one of the corners which serves as the bottom may be provided to have the above-stated R value. In the above stated embodiments, an entire envelope is integrally formed or an envelope is coupled with a left segment and a right segment. However, if an envelope, of which the inside diameter largely changes part of the ceramic envelope from the end portion of a barrel section to an electrode insertion section, is formed by integrally forming, light emission materials in a discharge space can be reduced, and the service life of the lamp can be extended.

As stated so far in detail, the present invention can extend the service life of the lamp and reduce the change of light color. Additional advantages and modifications will readily occur to those skilled in the art. Therefore, the invention in its broader aspect is not limited to the specific details and representatives shown and described herein. Accordingly, various modifications may be made without departing from the spirit or scope of the general inventive concept as defined by the appended claims and their equivalents.

What is claimed is:

1. A light transmittable ceramic envelope for a high intensity discharge lamp, comprising a barrel section defining a discharge space, said barrel section having integrally formed end portions, said end portions having an inner diameter smaller than an inner diameter of said barrel section to form electrode insertion sections protruding outwardly from said barrel section, wherein a terminal end of each said electrode insertion section defines a respective terminal end of said ceramic envelope, wherein a thickness dimension of each said electrode insertion section, defined between outer and inner surfaces thereof, is substantially constant along the entire length thereof, and wherein a boundary portion between said barrel section and said inner surface of each said electrode insertion section has a radius of curvature R in a range of 0.01 mm to 3.0 mm.

2. The ceramic envelope according to claim 1, wherein a surface roughness Rmax of an inner surface of said barrel section is in a range of 0.01 to 0.4 mm; and a density of an additive present on said inner surface of said barrel section is not more than half a density of said additive present in a thick central portion of the barrel section.

3. The ceramic envelope according to claim 2, wherein said additive contains at least one material selected from the group consisting of $Sc_2O_3$, MgO, $ZrO_2$, $Y_2O_3$ and a lanthanoid-based rare earth oxide.

4. The ceramic envelope of claim 1, wherein said barrel section is substantially elliptical.

* * * * *

UNITED STATES PATENT AND TRADEMARK OFFICE
CERTIFICATE OF CORRECTION

PATENT NO.   : 6,747,411 B2
DATED        : June 8, 2004
INVENTOR(S)  : Sugio Miyazawa Page 1 of 1

It is certified that error appears in the above-identified patent and that said Letters Patent is hereby corrected as shown below:

Title page,
Item [57], ABSTRACT,
Line 11, delete "," after "space"

Column 6,
Line 19, change "mm" to -- $\mu$m --.

Signed and Sealed this

Twenty-first Day of December, 2004

JON W. DUDAS
*Director of the United States Patent and Trademark Office*